United States Patent [19]
Ito et al.

[11] Patent Number: 5,449,875
[45] Date of Patent: Sep. 12, 1995

[54] METHOD OF CONTROLLING SPOT WELDING ROBOT

[75] Inventors: Takayuki Ito; Kouichi Ohkanda, both of Oshino, Japan

[73] Assignee: Fanuc Limited, Yamanashi

[21] Appl. No.: 199,277

[22] PCT Filed: Jul. 1, 1993

[86] PCT No.: PCT/JP93/00905
§ 371 Date: Mar. 3, 1994
§ 102(e) Date: Mar. 3, 1994

[87] PCT Pub. No.: WO94/01237
PCT Pub. Date: Jan. 20, 1994

[30] Foreign Application Priority Data

Jul. 6, 1992 [JP] Japan .................................. 4-200111

[51] Int. Cl.6 ............................................ B23K 11/00
[52] U.S. Cl. ...................................... 219/86.7; 901/42
[58] Field of Search ........................ 219/86.7, 89, 91.1; 901/42

[56] References Cited

U.S. PATENT DOCUMENTS 4,733,042  3/1988  Nishiwaki et al. ................. 219/89
5,340,960  8/1994  Takasaki et al. .................. 219/86.7

FOREIGN PATENT DOCUMENTS 1-215472  8/1989  Japan .
5-33968   5/1993  Japan .

*Primary Examiner*—Clifford C. Shaw
*Attorney, Agent, or Firm*—Staas & Halsey

[57] ABSTRACT

Before executing a spot welding by a robot, a pressurization command is issued to a welding gun to measure the time required before receiving a pressurization completion signal from a welding gun. Thus measured value is set and stored as a time (T0) required for pressurization. Then, in executing a spot welding, the time in second (T) required to complete the positioning of the robot after the start thereof is calculated. Thus, based on these calculations, a time to start the pressurization of the welding gun is determined so that the time of completing the pressurization of the welding gun coincides with the time of completing the positioning of robot. As a result, no waiting time is required after the completion of positioning, thereby reducing the operating time.

6 Claims, 4 Drawing Sheets

METHOD OF CONTROLLING SPOT WELDING ROBOT

TECHNICAL FIELD

The present invention relates to an improvement in the method of controlling a spot welding robot, more particularly, to a control method ensuring a correct timing to issue a pressurization command to a welding gun.

BACKGROUND ART

The following two aspects are well known as a method of controlling a robot for carrying out a spot welding. A first is a method comprising the steps of, in the mentioned order, (1) detecting the completion of a positioning action for a spot welding; (2) issuing a gun pressurization command to a spot welding gun; (3) detecting the input of a pressurization completion signal from the spot welding gun; and (4) performing a welding operation by the spot welding gun through the issue of the welding command. A second is a method comprising the steps of (1) issuing a gun pressurization command before detecting the completion of the positioning action for the spot welding (that is, during the positioning action for the spot welding; (2) detecting the input of a gun pressurization completion signal; (3) issuing a welding command to execute a welding operation by a spot welding gun.

The robot control method according to the second aspect will now be described with reference to a timing chart in FIG. 5. In the timing chart, a gun pressurization command designated at (b) is a pressurization command for allowing the spot welding gun to be ready for a welding operation; and a welding command designated at (c) is a command for allowing the spot welding gun to perform an actual welding action based on welding conditions such as current and voltage to be applied which are preset in a robot controller. Both the commands are sent to the spot welding gun from the robot controller. A welding completion signal designated at (d) is a confirmation signal which is sent to the robot controller from the robot welding gun at the point when the welding operation has been fully completed; and a pressurization completion signal designated at (e) is a confirmation signal to be outputted to the robot controller by the spot welding gun for which completion of pressurization has been detected.

In the timing chart in FIG. 5, during the positioning action for the spot welding (before the completion of the positioning action at time t2), the gun pressurization command is issued in advance (at time t1), and the input of the pressurization completion signal is detected (at time t3) to issue the welding command for welding operation. After detecting the welding completion signal from the spot welding gun (at time t4), a positioning action for the next welding point will be started after a predetermined standby period (until the time t5).

According to the known control method, for the gun to be used, the time period between the time at which the pressurization command has been issued to the relevant gun, and the time at which the pressurization completion signal is obtained following the completion of the pressurization, is estimated and stored previously in the controller as the expected time T0 required for the pressurization. Then, prior to starting of the positioning action for the spot welding, the movement time T (a time elapsed from time t0 time t2) required for the positioning of the robot will be calculated based on the distance L to the target position and the data of commanded moving speed F of the robot. Afterwards, there is calculated a difference (T−T0) between the movement time T and the expected time T0 required for pressurization which has been stored in the robot controller. Thus, the time to issue the gun pressurization command (setting of the time t1) is so determined as to be capable of receiving a pressurization completion signal from the gun immediately after the completion of the positioning of the robot. More specifically, by allowing the gun pressurization command to be issued at the point (t1) at which the time period (T−T0) has elapsed starting from the point (t0) at which the positioning action is started, the point (t2) at which the expected time (T0) required for pressurization has elapsed from that point (t1) is made to coincide with the point of positioning completion (T−T0+T0=T).

In such a conventional control method, however, the value of the expected time T0 required for pressurization to be set in the robot controller has been exclusively determined depending on the experience of the user side. This may bring about a problem such that, even though the expected time required for pressurization is estimated to be T0, as shown in FIG. 5, for example, if the value T0 is smaller than the actual time T0' (T0<T0') required for pressurization, then the welding command is not permitted to be issued until a certain time has elapsed from the time of completion of the positioning action (time t2) of the robot, causing problems such as prolongation of total operating time. On the other hand, if the expected time t0 required pressurization is larger than the actual time T0' (T0>T0') required for pressurization, the welding command will be issued untimely prior to the completion of the positioning action of the robot to start the welding operation, which may hinder satisfactory performance of welding operation.

DISCLOSURE OF THE INVENTION

The object of the present invention is to provide a method of controlling a spot welding robot, capable of eliminating a standby time, which is wasteful for a robot in carrying out a welding operation in response to a command, and prohibiting an output of a welding command previous to the completion of the positioning action of the robot, therefore enabling an effective and secure spot welding operation.

In order to accomplish the above object, one aspect of the present invention comprises steps of: measuring by a robot controller a time elapsed until the robot controller receives pressurization completion signal from a spot welding gun after the robot controller issues a pressurization command to the spot welding gun; setting and storing thus measured value into a memory of the robot controller as a time required for pressurization for the spot welding gun; when controlling a robot by the robot controller to execute a spot welding operation by the spot welding gun, calculating a movement time required for the completion of the positioning of the robot after the start thereof; and issuing a gun pressurization command to the welding gun by the robot controller at the point when a time obtained by subtracting the elapsed time from the movement time has elapsed after issuing the positioning command to the robot from the robot controller.

Another aspect of the present invention comprises the steps of measuring by a robot controller a time which has elapsed until the robot controller receives a pressurization completion signal from a spot welding gun after the robot controller issues a pressurization command to the spot welding gun; setting and storing thus measured value into a memory of the robot controller as a time required for pressurization for the spot welding gun; when controlling a robot by the robot controller to execute a spot welding operation by the spot welding gun, calculating a movement time required for the completion of the positioning of the robot after the start thereof; comparing the time required for pressurization with the movement time; if the time required for pressurization is equal to or more than the movement time, causing the robot controller to issue a gun pressurization command to the welding gun simultaneously with the issue of the robot positioning command; and, if the time required for pressurization is less than the movement time, causing the robot controller to issue a gun pressurization command to the welding gun at the point when a time obtained by subtracting the elapsed time from the movement time after issuing the positioning command to the robot by the robot controller has elapsed.

Preferably, the method further comprises the steps of executing plural number of times of measurement of the elapsed time for the same gun; finding a mean value of the actually measured values; and storing the mean value into the memory as a time required for pressurization for the welding gun.

Preferably, the time required for pressurization to be stored into the memory of the robot controller is the number of processing periods obtained by dividing the movement command to the robot by the predetermined processing cycle.

As described above, according to present invention, there is actually measured and stored within the robot a time required until completing the gun pressurization after issuing the pressurization command to the welding gun from the robot, thereby enabling the gun pressurization command to be issued at the most suitable point in time in view of operational efficiency.

BRIEF DESCRIPTION OF THE DRAWINGS

FIG. 8 is a diagram conceptually showing the case of the drive control of the robot body based on the conventional time sharing processing method.

BEST MODE FOR CARRYING OUT THE INVENTION

Figure 1:
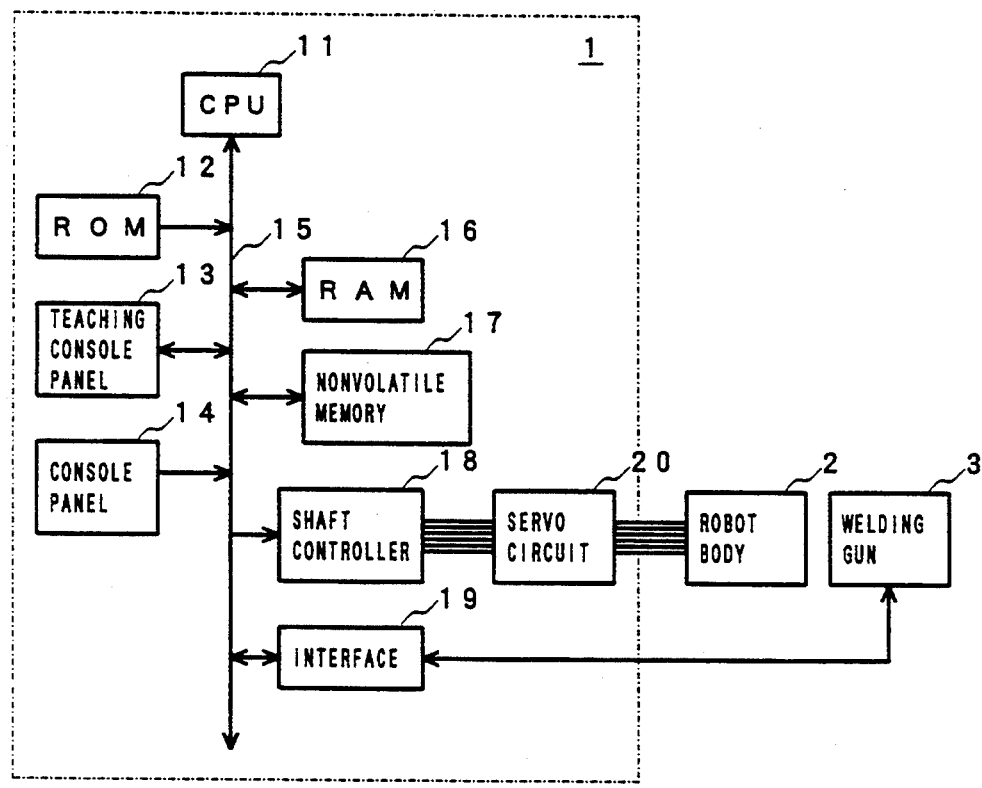
FIG. 1 is a block diagram schematically showing an example of a spot welding robot for carrying out the method of the present invention.

Preferred embodiments of the present invention will now be described with reference to the accompanying drawings. FIG. 1 is a block diagram schematically showing an example of an industrial robot equipped with a spot welding gun, that is, a spot welding robot. The spot welding robot generally comprises a robot controller 1, a robot body 2, and a robot welding gun 3 attached to a wrist or the like of the robot body 2. The robot controller 1 includes a CPU or a microprocessor 11.

Electrically connected through a bus 15 to the microprocessor 11 are a ROM 12 for storing, e.g., a control program; a RAM 18 for use in, e.g., temporarily storing data; a nonvolatile memory 17 which, e.g., stores a time T0 needed to complete a pressurization of the spot welding gun 3 after issuing a gun pressurization command to the spot welding gun 3 and stores an operation program prepared by, e.g., a teaching operation; a teaching console panel 13 for teaching an action to the robot; a console panel 14; a shaft controller 18 for driving and controlling shafts of the robot body 2 by way of a servo circuit 20; an input/output interface 19 and the like. The input/output interface 19 is connected to the spot welding gun 3 through a signal line which is used for the input/output of, e.g., the gun pressurization command, a welding command, a pressurization completion signal, and a welding completion signal.

Figure 6:
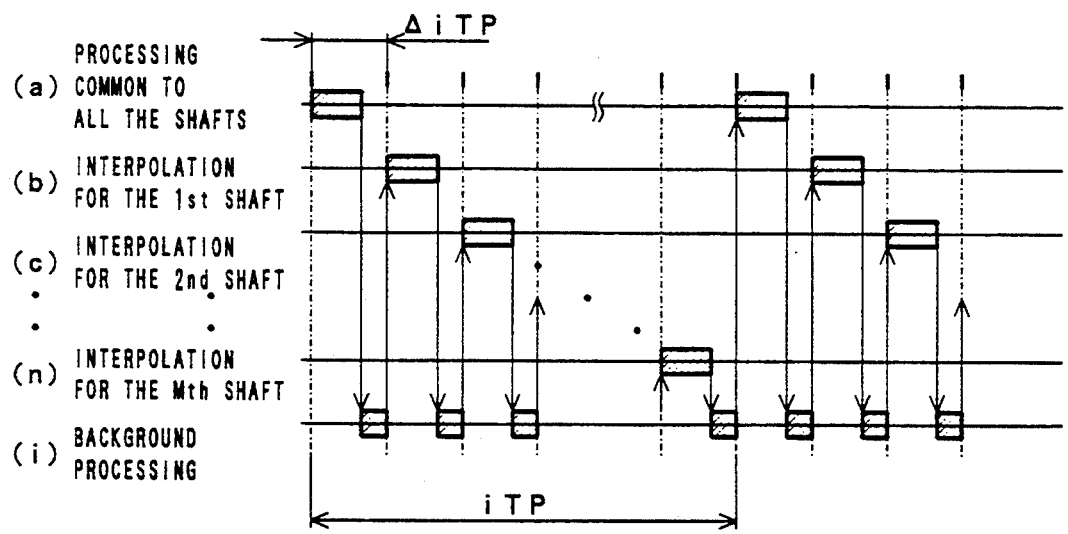

For the driving and control of the robot body 2 by means of the robot controller 1, a conventional time-sharing processing method is employed. More specifically, as shown in FIG. 6, a combination of the following processings is repeatedly executed in every predetermined processing cycle iTP; a processing common to all the shafts for calculating the interpolation command value or the like, as is represented by section (a) in the diagram; a shaft interpolation processing for each shaft based on the interpolation command value, corresponding to sections (b)–(h); a program editing which is not directly relating to the drive and control of individual shafts, and a background processing for detecting key operations including a teaching operation, on the teaching console panel 13 and the console panel 14. Each of the above processings is performed in order at a period $\Delta iTP$.

Figure 2:
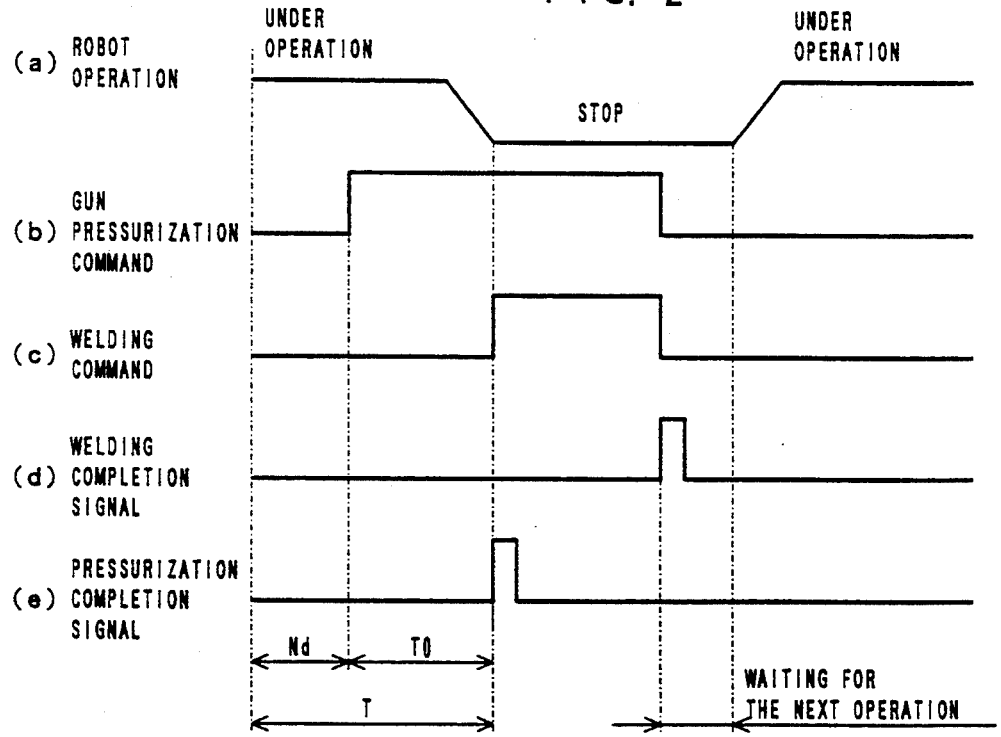
FIG. 2 is a signal input/output timing chart for a robot controller in accordance with an embodiment of a robot control method of the present invention.
Figure 3:
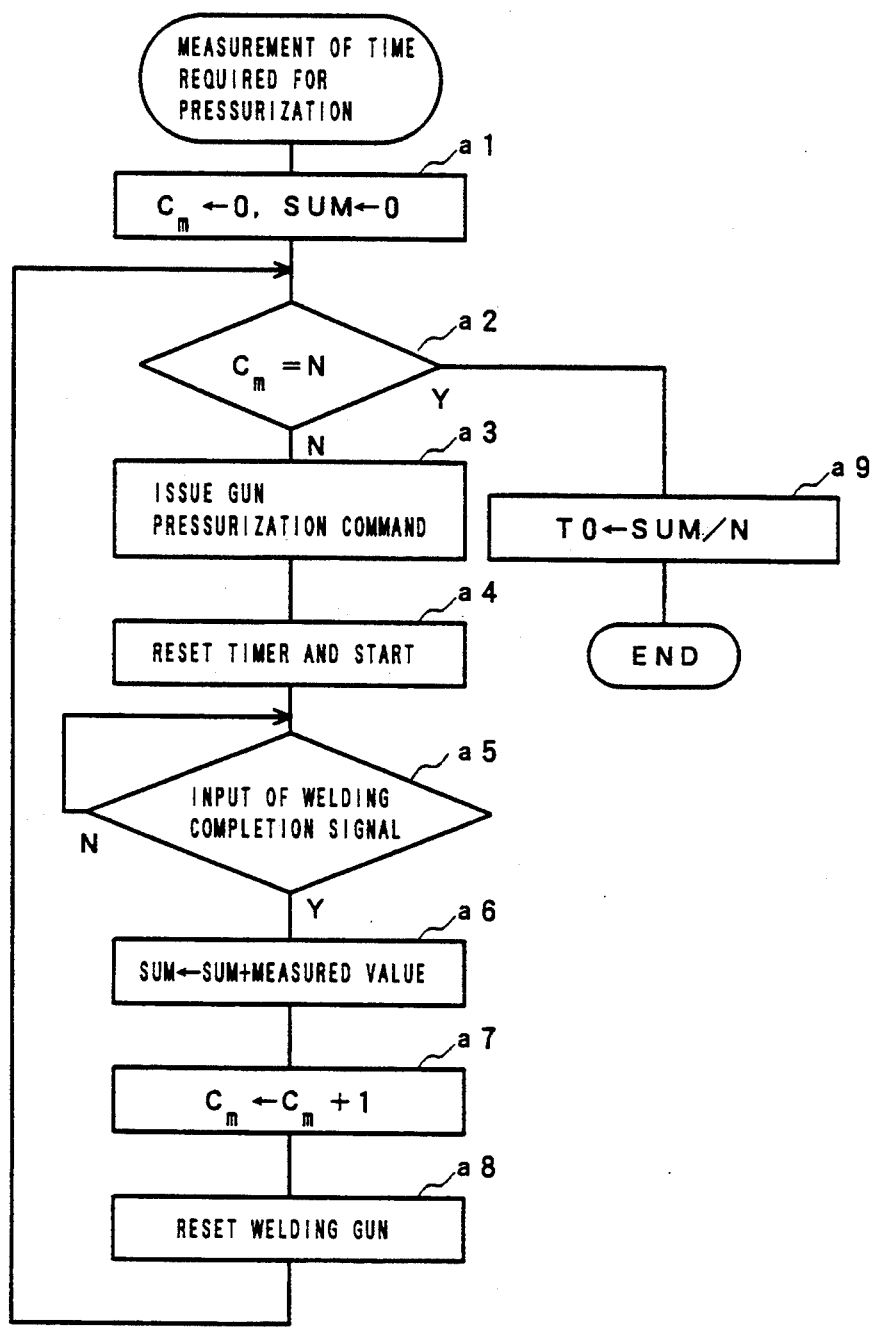
FIG. 3 is a flowchart schematically showing a processing for measuring a time required for pressurization using the robot controller shown in FIG. 2.
Figure 4:
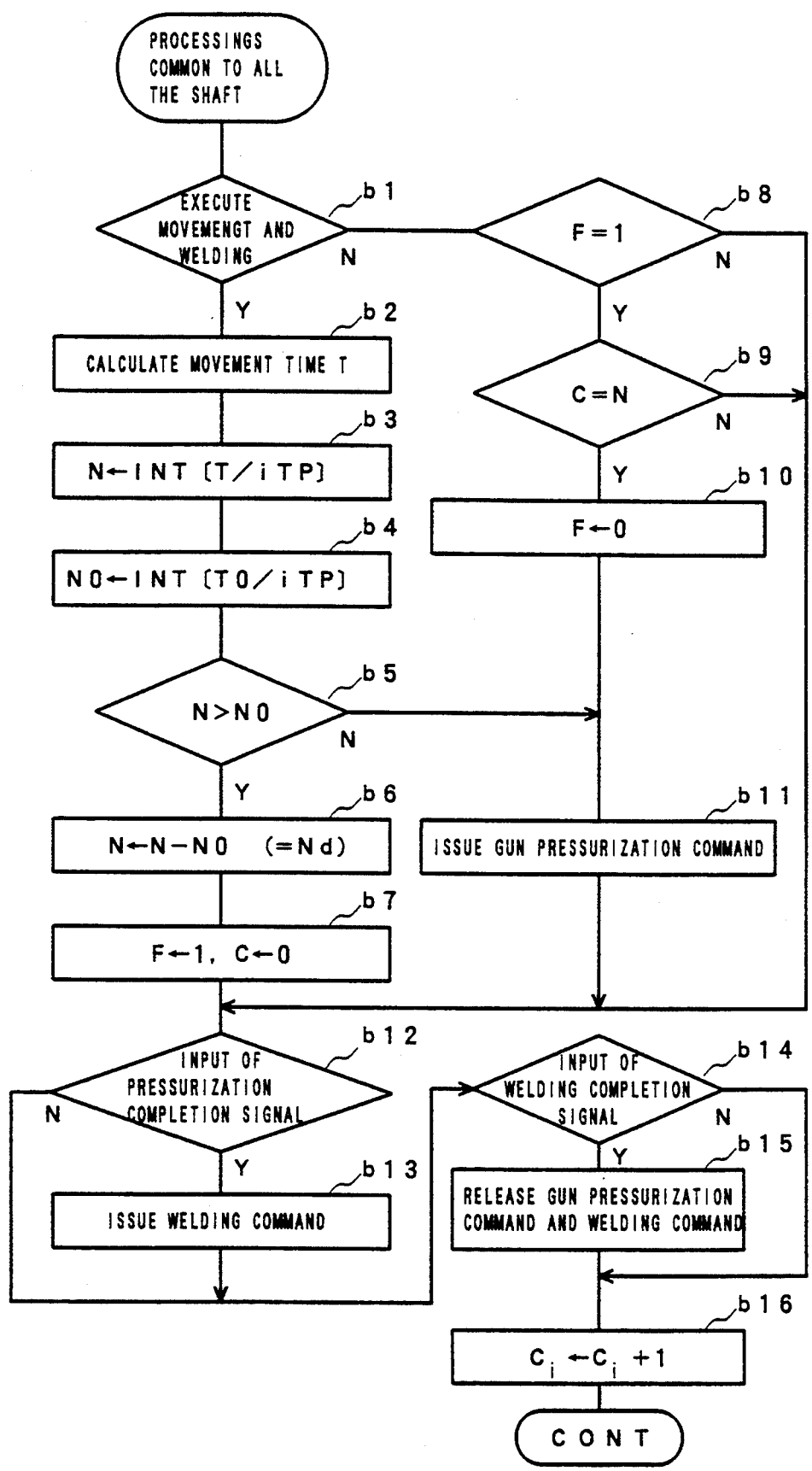
FIG. 4 is a flowchart schematically showing a pressurization command output processing by the robot controller shown in FIG. 2.
Figure 5:
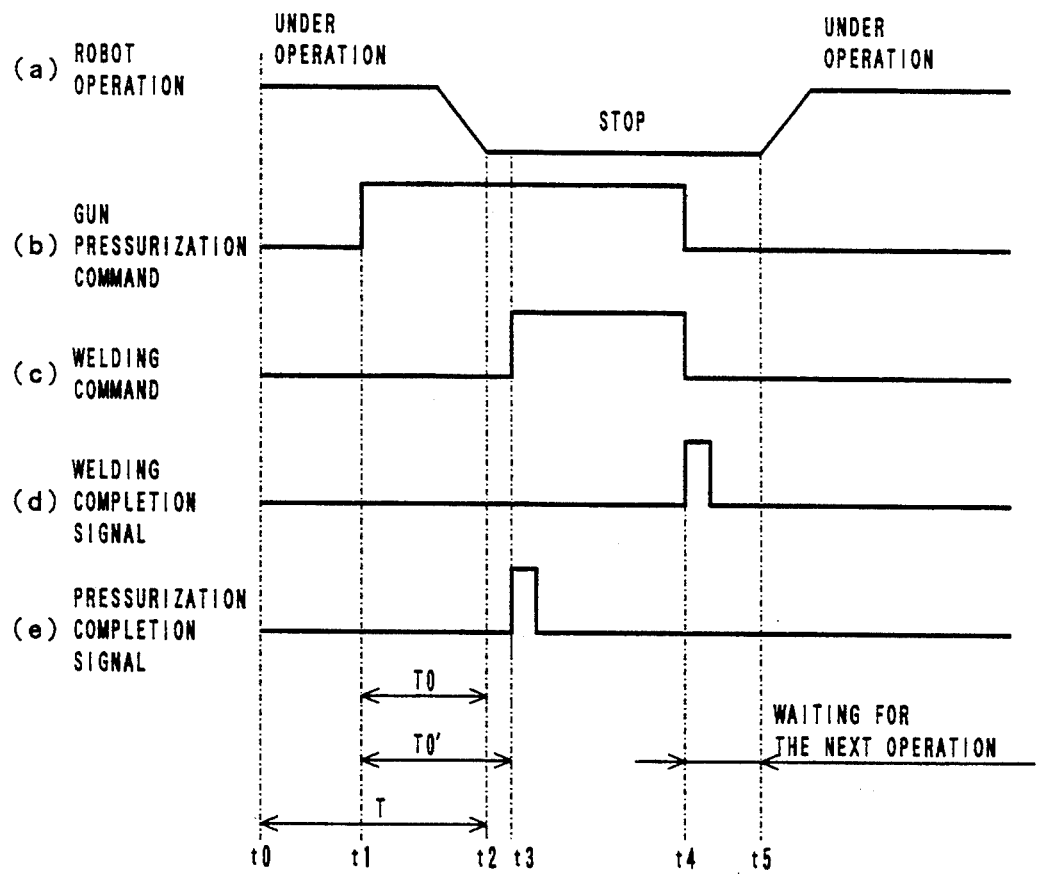
FIG. 5 is a signal input/output timing chart for the robot controller in accordance with the conventional robot control method.

FIG. 3 is a flowchart functionally showing an outline of a "processing for measuring a time required for pressurization" to be executed in the above-described background processing correspondingly to a command operation of the console panel 14 by the operator, though various interrupt processings and the like are omitted. FIG. 4 is a flowchart showing an outline of a "processing for issuing a pressurization command" which is to be repeatedly carried out in every predetermined processing cycle (iTP) together with the above-mentioned processing common to all the shafts. Furthermore, FIG. 2 is a timing chart showing the input/output of signals between the robot controller 1 and the spot welding gun 3 correspondingly to an action of the robot body 2 during the welding operation. Referring to these drawings, there will be described hereinbelow a method of controlling the spot welding robot in accordance with this embodiment.

When performing a welding operation by the spot welding robot for the first time or when newly performing a welding operation after replacing the spot welding gun 3 of the robot body 2 with another one, the operator operates a key on the console panel 14 to cause the microprocessor 11 of the robot controller 1 to execute the "processing for measuring a time required for pressurization". Prior to this execution the number of times N which the measurement is executed is set in the robot controller 1.

Then, the microprocessor 11 initializes to 0 both the value of a counter Cm storing the number of times of measurement and the value of a register SLIM integrating and storing the sum total of measured values (Step a1). Next, the microprocessor 11 determines whether or not the value of the counter Cm has reached the preset number of times N of the measurement (Step a2).

In the stage of being ready for a first measurement after initializing the values of both the counter Cm and the register SUM, and in the stage where the number of times of measurement has not yet reached N, the results of judgment in Step a2 becomes NO (N).

Then, the microprocessor 11 sends a gun pressurization command to the spot welding gun 3 via the input/output interface 19 (Step a3), starts measuring the time elapsed immediately after the initialization of the timer (Step a4), and enters the state waiting (the state standing by) for the input of the pressurization completion signal from the spot welding gun 3 (Step a5). Upon the receipt of the gun pressurization command from the robot controller 1, the robot welding gun 3 puts an actuator such as an air cylinder in motion to start a pressurizing action. As soon as it becomes possible to start a welding operation, the spot welding gun 3 sends a pressurization completion signal to the robot controller 1 via the input/output interface 19.

The microprocessor 11 waiting for the input of the pressurization completion signals from the spot welding gun 3 detects through the judgment processing in Step a5 the entry of the pressurization completion signal, and immediately stop the action of the timer. Then, the measured value of the timer obtained at that time is added to the value being already stored in the register SUM (Step a6), and increments by 1 the value of the counter Cm which integrates and stores the number of times of measurement (Step a7). Thereafter, the microprocessor 11 issues a reset command to the spot welding gun 3 and confirms the return to the initial state of the spot welding gun 3 (Step a8), and again advances to the judgment processing in Step a2.

Afterwards, the microprocessor 11 repeatedly executes the processings from Step a2 to Step a8 in the same manner as the above until the value of the counter Cm reaches the preset number of times N of measurement and the judgment in Step a2 results in YES (Y), and then advances to the processing in Step a9 with the sum total of the results of measurement kept within the register SUM. Next, the sum total of the measurement results is divided by the number of times N of measurement, and the resultant value (or mean measured value) is stored in a time required storing register T0 of the nonvolatile memory 17. This mean measured value defines the time required for the pressurization. In other words, the time needed to complete the pressurization of the spot welding gun 3 after issuing the gun pressurization command to the spot welding gun 3 is determined based on the results of actual measurement.

When an operation program previously created for the spot welding is selected from the nonvolatile memory 17 to start a playback action after storing into the nonvolatile memory 17 thus obtained actual mean measured value To of the time required for the pressurization, the microprocessor 11 repeatedly executes a "pressurization command output processing" as shown in FIG. 4, along with the processing common to the all shafts, for each of the predetermined processing cycle iTP.

The microprocessor 11, after having calculated an interpolation command value and the like for each shaft based on the operation program by the conventional processing common to all the shafts to advance to the "pressurization command output processing", first determines whether or not a movement command for the spot welding as an object of the calculation of the interpolation command value has "newly" been read in the "common processing to all shafts" (see FIG. 6(a)) of the present cycle (Step b1).

If the movement command for the spot welding as the object of the calculation of the interpolation command value is "newly" read in the above-mentioned "common processing to all shafts", the microprocessor 11 calculates a movement time T, required for the robot body 2 to complete the positioning at a welding point after starting its movement, based on distance of movement L and a commanded moving speed F specified by this movement command (Step b2). Then, the value T is divided by the processing cycle iTP into an integer to find the number of times N of executing the shaft interpolation processing for each shaft required for completing the positioning after the start of the movement. Thus obtained N is stored in a register N (Step b3).

Subsequently, the microprocessor 11 reads out from the nonvolatile memory 17 (the storage register T0) a time T0 required for the pressurization of the spot welding gun 3, and divides the value T0 by the processing cycle iTP into an integer to thereby find the number of times NO of the shaft interpolation processing for each shaft to be executed during the time required T0. Thus obtained T0 is stored within a register NO (Step b4).

Then, the microprocessor 11 compares the number of times N of the shaft interpolation processing to be executed for each shaft corresponding to the movement time T needed to complete the positioning with the number of times NO of the shaft interpolation processing required for each shaft corresponding to the required pressurization time T0 for the pressurization of the spot welding gun 3 (Step b5).

In the case where the number of time N of the shaft interpolation processing for each shaft corresponding to the movement time T is larger than the number of time NO of the shaft interpolation processing corresponding to the time T0 required for the pressurization, that is, in the case as shown in FIG. 2, where the pressurization could be completed at the time of completion of robot positioning even when the gun pressurization command is outputted after the start of movement of the robot body 2, the number of times NO of the shaft interpolation processing for each shaft corresponding to the time required T0 for pressurization is subtracted from the number of times N of the shaft interpolation processing for each shaft corresponding to the movement time T to obtain the number of times to be executed Nd of the shaft interpolation processing for each shaft which corresponds to the waiting time [T−T0] from the point of starting the movement of the robot body 2 to the point of issuing the gun pressurization command, and the value thus obtained is set in the register N for updating (Step b6). Subsequently, the value of a counter Ci, which stores the number of times of the shaft interpolation processing for each shaft, is initialized to 0, thereby setting a pressurization command output standby flag F (Step b7).

Afterwards, the microprocessor 11 determines whether or not it receives a pressurization completion signal from the sport welding gun 3 (Step b12). In the state where a gun pressurization command has not been issued yet though the movement of the robot body started, or where the spot welding gun 3 has not yet issued the gun pressurization completion command though a gun pressurization command was issued, the determination in Step b12 will result in NO (N).

The microprocessor 11, with the determination of NO in Step b12, further determines whether or not it receives the welding completion signal from the spot welding gun 3 (Step b14).

In the state of waiting for a welding command or in the state where the welding is in progress and thus has not been completed, the determination will be NO (N), and the microprocessor 11 increments by one the value of the counter Ci, which stores the number of times of the shaft interpolation processing for each shaft, to complete the "pressurization command output processing" in the present processing cycle (Step b16).

Upon the completion of the "pressurization command output processing", the shaft interpolation processing is executed sequentially for each shaft in each subsequent period $\Delta iTP$ (see FIG. 6(b) to (h)) to start the positioning action of the robot body 2, based on the interpolation command value for each shaft of the robot which was calculated in the processing common to all the shafts (see FIG. 6(a)) in each period of $\Delta iTP$ in the present processing cycle (iTP).

If the microprocessor 11 determines that the present processing cycle (iTP) is not a "newly" read processing cycle but a subsequent processing cycle, the determination in Step b1 will result in NO (N). Then, the microprocessor 11 determines whether or not the pressurization command output waiting flag F is set (Step b8). However, since the pressurization command output waiting flag F remains set to 1 without having been reset later, the determination in Step b8 will result in YES (Y).

Thereafter, the microprocessor 11 determines whether or not the value of the counter Ci, which stores the number of times of the shaft interpolation processing for each shaft (in Step b16), has reached the value N stored within the register N (in Step b6), that is, determines whether or not the shaft interpolation processing for each shaft has been repeatedly executed in response to the number of times of the shaft interpolation processing for each shaft corresponding to the waiting time [T−T0] from the point of starting the movement of the robot body 2 to the point of issuing the gun pressurization command (Step b9). If the value of the counter Ci has not yet reached the value of the register N, and therefore, if the present processing cycle (iTP) has not yet reached the cycle to issue the gun pressurization command, the microprocessor 11 executes determination processing in Steps b12 and b14, which will both result in NO (N), and then increments by one the value of the counter Ci, which stores the number of times of the shaft interpolating processing for each shaft, to end the "pressurization command output processing" in the present processing cycle (Step b16).

Then, the microprocessor 11 sequentially executes the shaft interpolation processing in each period $\Delta iTP$ in the same processing cycle (iTP) (see FIG. 6(b) to FIG. 6(h)), and continuously performs the positioning action of the robot body. Since the interpolation processing for each shaft is carried out once in each processing period $\Delta iTP$ in the same processing cycle, the value of the counter Ci to be incremented for each processing cycle indicates the same value as the number of times of the shaft interpolation processing for each shaft.

Subsequently, the microprocessor 11 repeatedly performs the processings of Steps b1, b8, b9, b12, b14 and b16 in the "pressurization command output processing" for each processing cycle (iTP) in the same manner as the above, and waits for the time when the value of the counter Ci reaches the value of the register N. As a result of the repetition of the above processing, if the value of the counter Ci reaches the value of the register, and there is detected in the determination processing of Step b9 that the shaft interpolation processing for each shaft has been executed repeatedly in response to the value of the number of times of the shaft interpolation processing for each shaft corresponding to the standby time [T−T0] from the point of starting the movement of the robot body 2 to the point of issuing the gun pressurization command, the microprocessor 11 resets the pressurization command output standby flag F (Step b10), and, as shown in FIG. 2, issues the gun pressurization command to the sport welding gun 3 to start the pressurizing action of the spot welding gun 3 (Step b11).

After starting the pressurizing action of the spot welding gun 3, the microprocessor 11 executes the processing of Steps b12, b14 and b16 in the same manner as the above. In the "pressurization command output processing" in the processing cycle succeeding this processing cycle (iTP), as the pressurization command output standby flag F is reset (F=0) correspondingly to the output of the gun pressurization command through the above-described processing in Step b10, there will be repeatedly carried out the processing in Steps b1, b8, b12, b14 and b16. Then, the processing cycle (iTP) is executed repeatedly by the number of times of execution corresponding to the time required T0 for the pressurization of the spot welding gun 3 with the count starting from the point of issuing the gun pressurization command. At the moment of the completion of the execution of processing by the number of times N0, all the interpolation processing for each shaft in response to the input of the movement command has already been finished. Simultaneously with the completion of the robot positioning action (FIG. 2(a)), the pressurization of the spot welding gun 3 is also completed, and the sport welding gun issues the pressurization completion signal to the robot controller 1 (FIG. 2(e)).

Then, the microprocessor 11, which is in the process of repeatedly executing the processing of the Steps b1, b8, b12, b14 and b16 in the "pressurization command output processing" during the processing cycle (iTP), detects the input of the pressurization completion signal in the determination processing of the Step b12, and issues the welding command to the spot welding gun 3 (FIG. 2(c)) to start the actual welding action (Step b13). Subsequently, in the same manner as the above, after executing the processing of Steps b14 and b16, the microprocessor 11 repeatedly executes the processing of Steps b1, b8, b12, b14 and b16 in the "pressurization command output processing" during the subsequent processing cycle (iTP).

Then, when the robot controller 1 receives the welding completion signal from the spot welding gun 3 upon the completion of the welding operation by the spot welding guns (FIG. 2(d)), the microprocessor 11, which executes the processing of Steps b1, b8, b12, b14 and b16, detects the input of the welding completion signal though the determination processing in Step b14 to stop the output of the gun pressurization command and welding command (FIGS. 2(b) and 2(c)), and returns the spot welding gun 3 to the initialized state (Step b15). Subsequently, after executing the processing of Step b16 in the same manner as the above, there will be repeatedly executed the processing of Steps b1, b8, b12, and b16 in the "pressurization command output processing" during the subsequent processing cycle (iTP).

Then, when the movement command for the spot welding as an object for the calculation of the interpolation command value is newly read in the processing common to all the shaft in the next and subsequent processing cycle (iTP), the microprocessor 11 detects it through the processing of Step b1, and repeatedly executes the "pressurization command output processing" in the same manner as the above.

Where the determination in Step b5 results in NO in the "pressurization command output processing" during the processing cycle (iTP) at the point when the movement command for the spot welding as an object for the calculation of the interpolation command value is newly read, that is, where it is determined that the required time T0 for the pressurization is longer than the movement time T needed to complete the positioning, the microprocessor 11 issues the gun pressurization command immediately without setting the pressurization command output standby flag F after executing the determination processing of Step b5 (Step b11). Then the microprocessor 11 repeatedly executes the processing of Steps b1, b8, b12, b14 and b16 to wait for the input of the pressurization completion signal from the spot welding gun 3. The processing after detecting the input of the pressurization completion signal through the determination processing is the same as the above. In this case, however, since time T0 required for pressurization is longer than the movement time T, no pressurization completion signal is inputted though the positioning of the robot body 2 has been completed, then welding operation will be carried out, waiting for the input of the pressurization completion signal in the same manner as described above.

Described in the foregoing as an embodiment of the present invention are the case where the time T0 required for the pressurization is to be measured and stored in the nonvolatile memory 17 only when the welding operation by the spot welding gun is executed for the first time by the spot welding robot or only when the welding operation is executed after changing the spot welding gun of the robot body 2. However, the value of the time T0 required for pressurization may be measured actually each time the welding operation is carried out so that this measured value may be stored in the nonvolatile memory 17 as the latest required pressurization time T0 for updating in order that the "pressurization command output processing" can be executed based on the latest required pressurization time T0 as illustrated in FIG. 4. The actual measurement of the value of the time T0 required for pressurization for each of the welding operation can be implemented, for example, by starting the measurement of time by the timer or the count of the processing cycle (iTP) simultaneously with the execution of the processing of Step b11 in the "pressurization command output processing", while by stopping the measurement of time by the timer or the count of the processing cycle iTP at the point when the determination in Step b12 results in YES (Y), and successively storing into the nonvolatile memory 17 for updating the value of the time required for pressurization which was calculated based on the time measured by the timer or the value of count of the processing cycles (iTP). Further, storing constantly predetermined number of the actual measured values of the time required for pressurization for the welding operations carried out lately, an ordinary computer application techniques might allow the execution of the "pressurization command output processing" as shown in FIG. 4 by calculating the mean value of the time required for pressurization every time a welding operation is carried out.

What is claimed is:

1. A method of controlling a spot welding robot comprising the steps of:
   (a) measuring by a robot controller a time elapsed until said robot controller receives a pressurization completion signal from a spot welding gun after said robot controller issues a pressurization command to said spot welding gun;
   (b) setting and storing thus measured value into a memory of said robot controller as a time required for pressurization for said spot welding gun;
   (c) calculating a movement time required for the completion of the positioning of said robot after the start thereof in the case of controlling a robot by said robot controller to execute a spot welding operation using the spot welding gun specified in step (a); and
   (d) issuing a gun pressurization command to said welding gun by said robot controller, at the point when a time obtained by subtracting said elapsed time from said movement time after issuing said positioning command to said robot from said robot controller has elapsed.

2. A method of controlling a spot welding robot according to claim 1, further comprising the steps of:
   executing plural number of times of measurement of said elapsed time of step (a) for the same gun;
   finding a mean value of said actually measured values; and
   storing said mean value into said memory of step (b) as a time required for pressurization for said welding gun.

3. A method of controlling a spot welding robot according to claim 1, wherein
   said time required for pressurization to be stored into said memory of said robot controller of step (b) is the number of processing periods obtained by dividing said movement command to said robot by predetermined processing cycles.

4. A method of controlling a spot welding robot comprising the steps of:
   (a) measuring by a robot controller a time elapsed until said robot controller receives a pressurization completion signal from a spot welding gun after said robot controller issues a pressurization command to said spot welding gun;
   (b) setting and storing thus measured value into a memory of said robot controller as a time required for pressurization for said spot welding gun;
   (c) calculating a movement time required for the completion of the positioning of said robot after the start thereof, in the case of controlling a robot by said robot controller to execute a spot welding operation by said spot welding gun in (a);

(d) comparing said time required for pressurization with said movement time;

(e) causing said robot controller to issue a gun pressurization command to said welding gun simultaneously with the issue of said robot positioning command, if said time required for pressurization is equal to or more than said movement time; and (f) causing the robot controller to issue the gun pressurization command to said welding gun at the point when a time obtained by subtracting said elapsed time from said movement time after the issue of said positioning command to said robot by said robot controller has elapsed, if said time required for pressurization is less than said moving time.

5. A method of controlling a spot welding robot according to claim 4, further comprising the steps of:

executing plural number of times of measurement of said elapsed time of step (a) for the same gun;

finding a mean value of said actually measured values; and storing said mean value into said memory of step (b) as a time required for pressurization for said welding gun.

6. A method of controlling a spot welding robot according to claim 4, wherein said time required for pressurization to be stored into said memory of said robot controller of step (b) is the number of processing periods obtained by dividing said movement command to said robot by predetermined processing cycles.

* * * * *

UNITED STATES PATENT AND TRADEMARK OFFICE
CERTIFICATE OF CORRECTION

PATENT NO. : 5,449,875
DATED : September 12, 1995
INVENTOR(S) : Takayuki Ito, et. al.

It is certified that error appears in the above-indentified patent and that said Letters Patent is hereby corrected as shown below:

Column 3, line 61, "8" should be --6--.

Column 4, line 11, "18" should be --16--.

Column 5, line 5, delete "SLIM" and insert --SUM--.

Signed and Sealed this

Second Day of January, 1996

*Attest:*

BRUCE LEHMAN

*Attesting Officer*      *Commissioner of Patents and Trademarks*